(12) United States Patent
Houtschilt et al.

(10) Patent No.: US 6,557,908 B2
(45) Date of Patent: May 6, 2003

(54) EXHAUST SYSTEM CLAMP ASSEMBLY AND ASSOCIATED METHOD

(75) Inventors: Robert Walter Houtschilt, Livonia, MI (US); Stephen Paul Allen, Commerence Township, MI (US); Kenneth Eugene Cook, Indianapolis, IN (US); Andrew John Herold, Bloomington, IN (US)

(73) Assignee: Arvin Technologies, Inc., Farmington Hills, MI (US)

( * ) Notice: Subject to any disclaimer, the term of this patent is extended or adjusted under 35 U.S.C. 154(b) by 0 days.

(21) Appl. No.: 09/912,988

(22) Filed: Jul. 25, 2001

(65) Prior Publication Data

US 2003/0020279 A1 Jan. 30, 2003

(51) Int. Cl.[7] .............................................. F16L 25/00
(52) U.S. Cl. ........................ 285/420; 285/330; 285/252; 285/253
(58) Field of Search ........................ 285/330, 420, 285/252, 253, 23; 403/270, 289, 290

(56) References Cited

U.S. PATENT DOCUMENTS

| | | | | |
|---|---|---|---|---|
| 2,598,338 A | * | 5/1952 | Arbogast | 228/138 |
| 3,327,945 A | * | 6/1967 | Pfister | 236/45 |
| 3,572,778 A | | 3/1971 | Cassel | |
| 3,574,358 A | | 4/1971 | Casssel | |
| 3,653,696 A | | 4/1972 | Cassel | |
| 3,827,733 A | | 8/1974 | Cassel | |
| 3,863,964 A | | 2/1975 | Cassel | |
| 3,905,623 A | | 9/1975 | Cassel | |
| 4,049,298 A | * | 9/1977 | Foti | 285/148.26 |
| 4,056,273 A | | 11/1977 | Cassel | |
| 4,142,743 A | * | 3/1979 | McGowen et al. | 285/148.26 |
| 4,147,384 A | | 4/1979 | Heckethorn | |
| 4,249,759 A | | 2/1981 | Heckethorn | |
| 4,261,600 A | | 4/1981 | Cassel | |
| 4,265,005 A | | 5/1981 | Heckethorn | |
| 4,288,105 A | * | 9/1981 | Press | 285/55 |
| 4,312,526 A | | 1/1982 | Cassel | |
| 4,365,392 A | | 12/1982 | Heckethorn | |
| 4,372,017 A | | 2/1983 | Heckethorn | |
| 4,393,559 A | | 7/1983 | Heckethorn et al. | |
| 4,463,975 A | * | 8/1984 | McCord | 285/419 |
| 4,602,811 A | | 7/1986 | Heckethorn et al. | |
| 4,623,164 A | | 11/1986 | Cassel et al. | |
| 4,629,226 A | | 12/1986 | Cassel et al. | |
| 4,660,862 A | | 4/1987 | Cassel et al. | |
| 4,753,462 A | * | 6/1988 | Liu | 285/420 |
| 4,813,720 A | | 3/1989 | Cassel | |
| 5,116,083 A | * | 5/1992 | Gillingham et al. | 285/23 |
| 5,290,974 A | | 3/1994 | Douglas et al. | |
| 5,310,158 A | | 5/1994 | Cassel | |
| 5,431,459 A | * | 7/1995 | Gundy | 285/237 |
| 5,588,680 A | * | 12/1996 | Cassel et al. | |
| 5,622,391 A | * | 4/1997 | Belik | 285/23 |
| 5,632,513 A | * | 5/1997 | Cassel | |
| 6,012,745 A | * | 1/2000 | Fuoss | 285/400 |
| 6,199,921 B1 | * | 3/2001 | Cassel et al. | 285/424 |

FOREIGN PATENT DOCUMENTS

| EP | 0 088 507 A1 | * | 1/1983 |
|---|---|---|---|
| EP | 0027140 | | 5/1984 |
| EP | 0222784 | | 3/1990 |

\* cited by examiner

*Primary Examiner*—Lynne H. Browne
*Assistant Examiner*—James M. Hewitt
(74) *Attorney, Agent, or Firm*—Barnes & Thornburg

(57) ABSTRACT

An exhaust apparatus includes a first pipe, a second pipe which includes a block, and a clamp positioned around a portion of a periphery of both the first pipe and the second pipe. The clamp is secured to the block.

24 Claims, 3 Drawing Sheets

EXHAUST SYSTEM CLAMP ASSEMBLY AND ASSOCIATED METHOD

BACKGROUND AND SUMMARY OF THE INVENTION

The present invention relates to a clamp assembly, and particularly to a clamp assembly for an exhaust system. More particularly, the present invention relates to a clamp assembly for clamping two pipes of the exhaust system together.

In automotive applications, a single piece of exhaust pipe is often required to extend a considerable distance along the length of a vehicle and to bend around various obstructions. As such, exhaust pipes are often provided in a number of separate sections which are coupled together. Each pipe section has a specific geometry or shape in order to avoid obstacles. As such, the individual pipe sections are positioned in a particular orientation relative to each other or the other components of the exhaust system (e.g. a muffler or catalytic converter) so that the entire exhaust system is properly fitted to the vehicle. To facilitate the process of creating an exhaust system with particular routing requirements, a mechanism and/or technique is needed that allows the exhaust pipe sections to be coupled to one another along with the other components associated with the exhaust system. Such a mechanism and/or technique is preferably relatively easy to use and allows for quick and accurate alignment of the individual components.

According to the disclosure, an exhaust apparatus includes a first pipe and a second pipe. The second pipe includes a block. The apparatus also includes a clamp positioned around a portion of a periphery of both the first pipe and the second pipe and is secured to the block.

In preferred embodiments, the first pipe is an outer pipe defining a passage and the second pipe is an inner pipe positioned in the passage. The outer pipe includes a side wall having a notch defined therein. The block contacts the side wall within the notch to prevent rotational movement of the outer pipe relative to the inner pipe.

The clamp includes a band and a flange coupled to the band. The band extends circumferentially about a portion of the periphery of the outer and inner pipes. The flange has a first fastener-receiving aperture defined therein and the block has a second fastener-receiving aperture defined therein. A fastener extends into both the first and second fastener—receiving apertures to couple the flange, and hence the clamp, to the block so that the band causes the outer pipe to clamp to the inner pipe.

Additional features of the present invention will become apparent to those of ordinary skill in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

A clamp assembly 10 is provided to clamp an outer pipe 12 to an inner pipe 14, as shown in FIGS. 2–7. Clamp assembly 10 is designed to prevent axial and rotational movement of outer pipe 12 relative to inner pipe 14.

Figure 3:
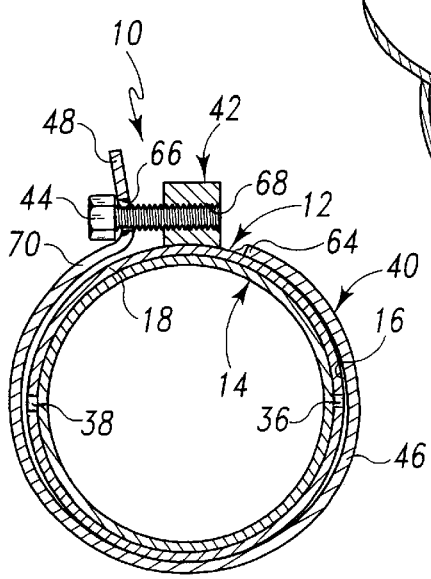
FIG. 3 is a transverse cross sectional view taken along line 3—3 of FIG. 2, as viewed in the direction of the arrows.
Figure 5:
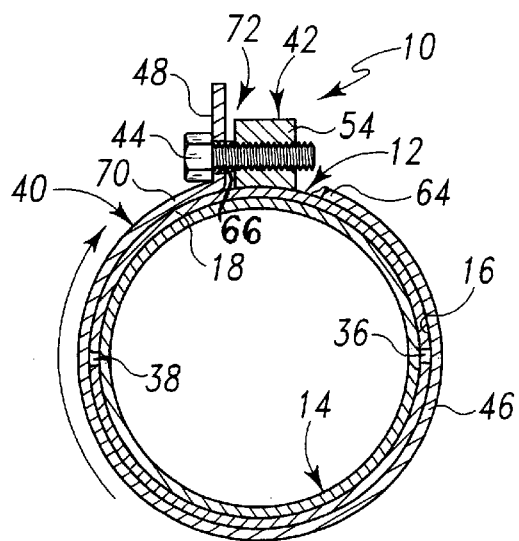
FIG. 5 is a transverse cross sectional view taken along line 5—5 of FIG. 4, as viewed in the direction of the arrows.
Figure 6:
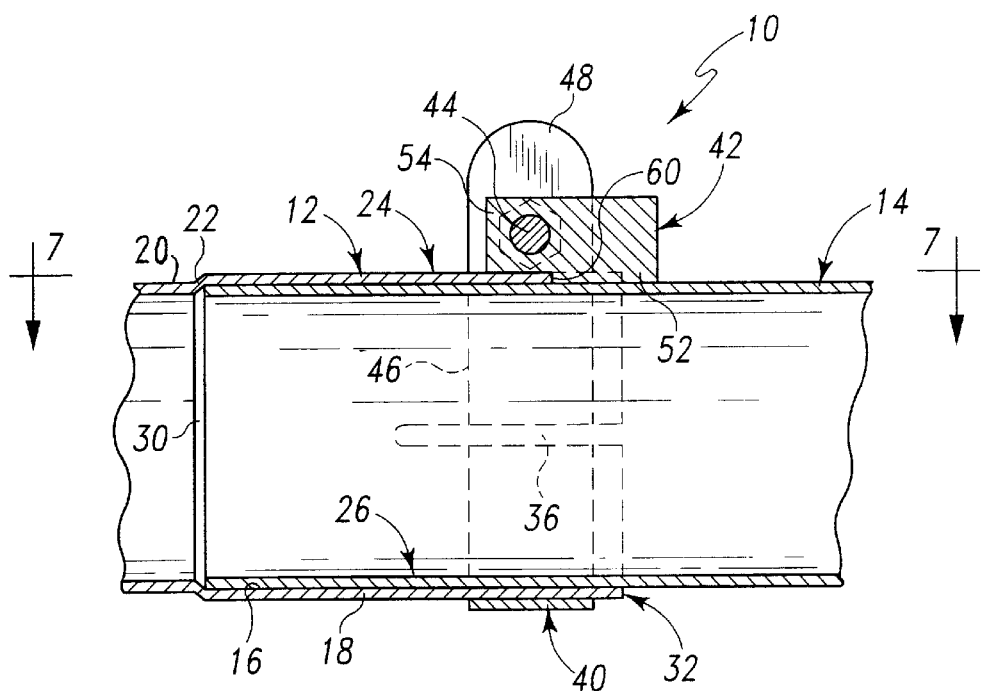
FIG. 6 is a longitudinal cross sectional view taken along line 6—6 of FIG. 4, as viewed in the direction of the arrows.

Inner pipe 14 is received or otherwise positioned within a passage 16 defined in outer pipe 12, as shown in FIGS. 3, 5, and 6. In particular, outer pipe 12 includes a larger diameter portion 18, a smaller diameter portion 20, and a transition portion 22 tapering from larger diameter portion 18 to smaller diameter portion 20. Larger diameter portion 18 includes an end 24 of outer pipe 12. Inner pipe 14 includes an end 26 positioned within passage 16 of end 24 of outer pipe 12. End 26 of inner pipe 14 includes a beveled, circular edge 30 that abuts transition portion 22 to prevent axially inward movement of inner pipe 14 relative to outer pipe 12 beyond a predetermined distance.

As shown in FIGS. 1–5, outer pipe 12 includes an side wall 32 having defined therein a first notch 34, a second notch 36, and a third notch 38. The functions of notches 34, 36, 38 are discussed below.

Inner pipe 14 includes a block 42. The block 42 may be secured to the inner pipe 14 in any number of manners. For example, in an exemplary embodiment, the block 42 may be welded to the outer surface of the inner pipe 14. It should be appreciated that the block 42 may be secured in a number of other manners. For example, the block 42 may be bolted to the inner pipe 14 or brazed to the inner pipe 14. Block 42 and inner pipe 14 may cooperate to provide a monolithic structure.

Although the block 42 is herein described and depicted as having a somewhat rectangular shape, other configurations of the block 42 are suitable for use. Specifically, the block 42 may take the form of any type of protrusion having a wide variety of shapes and geometries.

In the exemplary embodiment described herein, block 42 includes a base 52 and an arm 54 cantilevered to base 52, as shown in FIGS. 1, 2, 4, and 6. In preferred embodiments, block 42 is provided as a monolithic structure having base 52 and arm 54. Arm 54 extends axially away from base 52 in a direction toward the end 26 of inner pipe 14. Moreover, arm 54 is spaced apart from the outer surface of inner pipe 14 to define a pipe-receiving space 56. A portion of end 32 of outer pipe 12 is positioned within pipe-receiving space 56. Arm 54 has a second fastener-receiving aperture 68 defined therein. In preferred embodiments, second fastener-receiving aperture 68 is provided as a threaded aperture to receive fastener 44, which is preferably a threaded bolt.

Figure 1:
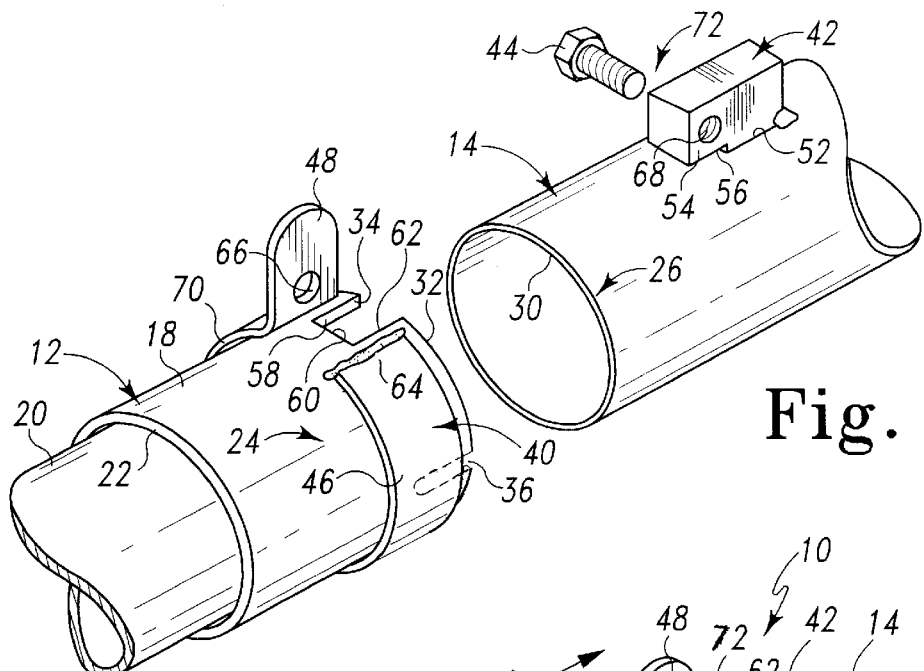
FIG. 1 is an exploded fragmentary perspective view of an outer pipe, an inner pipe, and a clamping assembly for clamping the outer pipe to the inner pipe.
Figure 2:
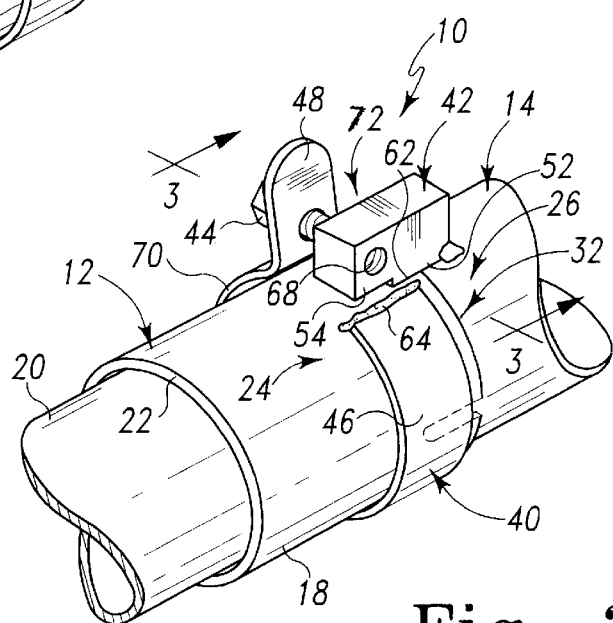
FIG. 2 is a fragmentary perspective view showing the inner pipe positioned within the outer pipe and the clamping assembly partially tightened.
Figure 4:
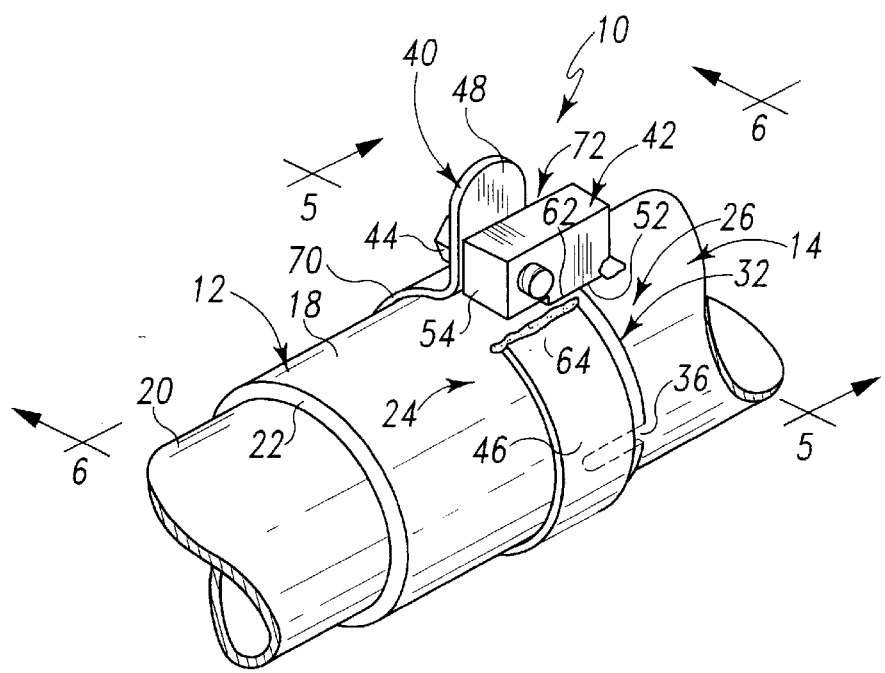
FIG. 4 is a fragmentary perspective view showing the clamping assembly fully tightened to clamp the outer pipe to the inner pipe.
Figure 7:
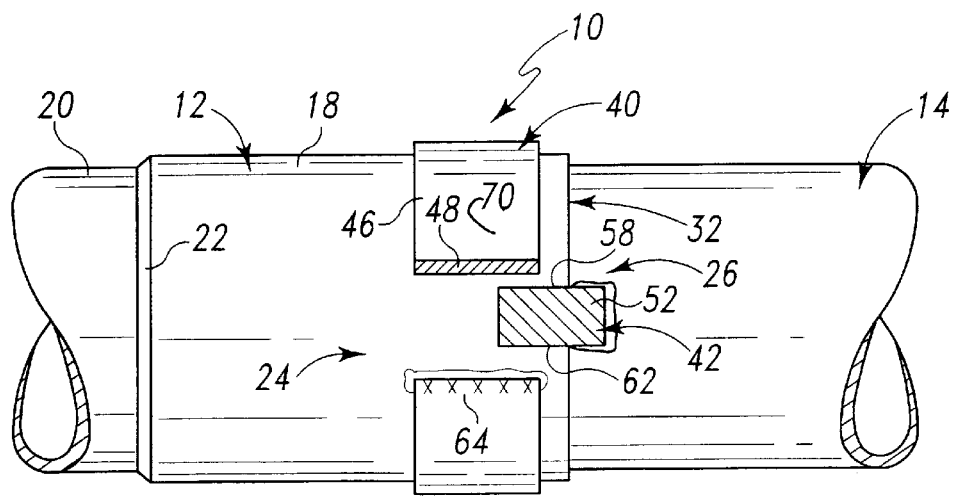
FIG. 7 is a cross sectional view taken along line 7—7 of FIG. 6, as viewed in the direction of the arrows.

When end 26 of inner pipe 14 is positioned in end 24 of outer pipe 12, base 52 of block 42 is received or otherwise positioned in first notch 34, as shown in FIGS. 2, 4, and 7. Base 52 contacts first, second, and third side wall portions 58, 60, 62 that cooperate to define first notch 34. The contact between base 52 and first and third side wall portions 58, 62 prevents rotational movement of outer pipe 12 and inner pipe 14 relative to one another. The contact between base 52 and second side wall portion 60 prevents axially inward movement of inner pipe 14 relative to outer pipe 12 beyond a predetermined distance. As shown in FIG. 2, second side wall portion 60 is positioned within pipe-receiving space 56 when the pipes 12, 14 are secured to one another.

Clamp 40 includes a band 46 and a flange 48 coupled to band 46 as shown in FIGS. 1–6. Band 46 extends circumferentially around a portion of the periphery of end 24 of outer pipe 12. Because end 26 of inner pipe 14 is positioned within end 24 of outer pipe 12, band 46 also extends circumferentially around a portion of the periphery of end 26 of inner pipe 14. Band 46 contacts end 24 of outer pipe 12 but is spaced apart from end 26 of inner pipe 14. Band 46 also covers a portion of second and third notches 36, 38.

Band 46 includes a first end 64 and a second end 70, as shown in FIGS. 1–5 and 7. First end 64 is secured to end 24 of outer pipe 12. In preferred embodiments, first end 64 is welded to end 24 of outer pipe 12. Second end 70 is coupled to flange 48. In preferred embodiments, band 46 is integrally formed with flange 48 at second end 70. The length of band 46, measured from first end 64 to second end 70, is less than the circumference of end 24 of outer pipe 12.

Flange 48 has a first fastener-receiving aperture 66 defined therein, as shown in FIGS. 1–6. First fastener-receiving aperture 66 aligns with second fastener-receiving aperture 68 to receive fastener 44 through both of first and second fastener-receiving apertures 66, 68 when the inner pipe 14 is received into the outer pipe 12.

Fastener 44 extends through first and second fastener-receiving apertures 66, 68 to couple flange 48 to block 42 and thereby tighten band 46 about outer pipe 12, as shown in FIGS. 4 and 5. In preferred embodiments, flange 48 remains spaced apart from block 42 when clamp assembly 10 clamps outer pipe 12 to inner pipe 14 to allow band 46 to provide sufficient clamping force about outer pipe 12, as shown in FIG. 5. In other preferred embodiments, flange 48 may contact block 48 so long as such contact does not interfere with band 46's ability to provide sufficient clamping force about outer pipe 12.

In addition to providing such clamping action of clamp 40, use of fastener 44 retains pipes 12, 14 in a desired position relative to one another. In particular, use of fastener 44 to couple clamp 40 to block 42 prevents axial movement of pipes 12, 14 relative to one another.

Second and third notches 36, 38 are provided to allow end 24 of outer pipe 12 to compress or otherwise flex slightly so that outer pipe 12 clamps to inner pipe 14 in response to band 46 being tightened about outer pipe 12. This clamping of outer pipe 12 to inner pipe 14 provides for sealing engagement of the outer pipe 12 to the inner pipe 14. Moreover, such clamping further prevents axial and rotational movement of outer pipe 12 relative to inner pipe 14.

Although the inner pipe 14 is herein described as including the block 42, and has advantages thereby in the present invention, other configurations are also contemplated. For instance, the outer pipe 12 may include the block 42.

The term "pipe" is used herein to not only include elongated sections of conduit, but also to include relatively short sections of conduit included in components of an exhaust system. For example, the relatively short conduit which extends outwardly from the inlet or outlet of a muffler or catalytic converter may be characterized as a pipe within the meaning used herein.

Although the invention has been described in detail with reference to certain preferred embodiments, variations and modifications exist within the scope and spirit of the invention as described and defined in the following claims.

What is claimed is:

1. An exhaust apparatus comprising
   a first pipe,
   a second pipe, the second pipe including a block, and
   a clamp positioned around a portion of a periphery of both the first pipe and the second pipe, wherein the clamp is coupled to the block.

2. The apparatus of claim 1, wherein
   the clamp includes a band and a flange,
   the clamp extends circumferentially around the portion of the periphery of both the first pipe and the second pipe, and
   the flange is coupled to both the band and the block.

3. The apparatus of claim 2, wherein the band includes an end fixedly secured to the first pipe.

4. The apparatus of claim 2, further comprising a fastener, wherein the flange has a first aperture defined therein and the fastener extends through the first aperture.

5. The apparatus of claim 4, wherein
   the block has a second aperture defined therein and
   the fastener is positioned in both the first aperture and the second aperture.

6. The apparatus of claim 1, wherein
   the first pipe has a side wall having a notch defined therein, and
   a portion of the block is positioned within the notch.

7. The apparatus of claim 6, wherein
   the block includes a base and an arm,
   the base is fixedly secured to the second pipe,
   the arm extends outwardly from the base,
   the arm and the second pipe cooperate to define a pipe-receiving space, and
   the first pipe is positioned within the pipe-receiving space.

8. An exhaust apparatus comprising
   an outer pipe having a passage defined therein,
   an inner pipe having a portion thereof positioned in the passage, the inner pipe including a block, and
   a clamp extending circumferentially around a portion of a periphery of both the outer pipe and the inner pipe, wherein the clamp is coupled to the block.

9. The apparatus of claim 8, wherein
   the clamp includes a band and a flange, wherein
   the flange is coupled to both the band and the block.

10. The apparatus of claim 9, wherein the band includes an end fixedly secured to the outer pipe.

11. The apparatus of claim 9, further comprising a fastener, wherein
   the flange has a first aperture defined therein,
   the block has a second aperture defined therein, and
   the fastener is positioned in both the first aperture and the second aperture.

12. The apparatus of claim 8, wherein
   the outer pipe has a side wall having a notch defined therein, and
   a portion of the block is positioned within the notch.

13. The apparatus of claim 12, wherein
   the block includes a base and an arm,
   the base is fixedly secured to the inner pipe,
   the arm extends outwardly from the base,
   the arm and the inner pipe cooperate to define a pipe-receiving space, and the outer pipe is positioned within the pipe-receiving space.

14. The apparatus of claim 13, further comprising a fastener, wherein the clamp has a first aperture defined therein, the arm has a second aperture defined therein, and the fastener is positioned in both the first aperture and the second aperture.

15. A method of securing a first exhaust pipe to a second exhaust pipe, the method comprising the steps of providing a first pipe, providing a second pipe which includes a block, positioning a clamp around a portion of a periphery of both the first pipe and the second pipe, and coupling the clamp to the block.

16. The method of claim 15, wherein the clamp includes a band and a flange, the positioning step includes the step of extending the band circumferentially around the portion of the periphery of both the first pipe and the second pipe, and the coupling step includes the step of coupling the flange to the block.

17. The method of claim 16, further comprising the step of securing an end of the band to the first pipe.

18. The method of claim 16, wherein (i) the flange has a first aperture defined therein, and (ii) the block has a second aperture defined therein, further comprising the step of positioning a fastener in both the first aperture and the second aperture.

19. The method of claim 15, wherein the first pipe has a side wall which has a notch defined therein, further comprising the step of advancing an end portion of the second pipe into the first pipe such that a portion of the block is positioned in the notch.

20. The method of claim 15, further comprising the step of advancing an end portion of the second pipe into a passage defined in the first pipe, wherein the advancing step is performed prior to the coupling step.

21. A coupler for coupling a first pipe and a second pipe to one another, the coupler comprising a block adapted to be coupled to the first pipe, a clamp adapted to extend circumferentially around a portion of a periphery of both the first pipe and the second pipe, the clamp including a first end portion and a second end portion, the first end portion being coupled to the block, the second end portion being adapted to be fixedly secured to the second pipe wherein the first end portion is spaced apart from the block when the first end portion is coupled to the block.

22. The coupler of claim 21, wherein the clamp includes a flange and a band coupled to the flange, the flange being coupled to the block, the band being adapted to extend circumferentially around the portion of the periphery of both the first pipe and the second pipe.

23. The coupler of claim 21, wherein the second end portion is spaced apart from the block when the first pipe and the second pipe are coupled to one another.

24. An exhaust apparatus comprising a pipe, and a block fixedly secured to the pipe, the block having a fastener-receiving aperture defined therein wherein the block is adapted to be secured to a clamp so as to secure the pipe to another pipe, and wherein the block includes a base and an arm adapted to be secured to the clamp, the base is fixedly secured to the pipe, and the arm is cantilevered to the base so as to extend away from the base in parallel, spaced-apart relation to the pipe.

\* \* \* \* \*